Jan. 26, 1954

A. BOYAJIAN 2,667,617

POLYPHASE TRANSFORMER SYSTEM WITH GROUNDED NEUTRAL

Filed Feb. 6, 1952

Inventor:
Aram Boyajian,
by Ernest H. Britton
His Attorney.

Patented Jan. 26, 1954

2,667,617

UNITED STATES PATENT OFFICE 2,667,617

POLYPHASE TRANSFORMER SYSTEM WITH GROUNDED NEUTRAL

Aram Boyajian, Pittsfield, Mass., assignor to General Electric Company, a corporation of New York Application February 6, 1952, Serial No. 270,228

4 Claims. (Cl. 323—44)

The invention relates to polyphase transformer systems and more particularly to an improved system for the grounded-neutral operation of the primary and secondary windings of the transformer system.

In three-phase electric power transmission and distribution practice by means of alternating-current transformers, not infrequently, it is found necessary to ground or make other use of the neutrals of both the primary and the secondary systems, and generally this is accomplished by connecting the primary windings in Y, the secondary windings in Y, and providing a third set of windings connected in delta fashion. This delta set of windings, in the language of the art, is for the purpose of "stabilizing" the neutral, involving third harmonic and zero-phase sequence impedance considerations well recognized in the art. The lower its reactance, the better does such a delta winding function for these purposes; but the lower the reactance, the larger is the physical capacity necessary for it to be self-protective under various short circuits not only in the delta circuit, but also in the primary and secondary circuits. And so, a compromise must be effected, and it has become customary to make the physical capacity of these auxiliary delta windings one third of the k. v. a. rating of the primary or secondary windings, even when there is no revenue load for these auxiliary windings. As such auxiliary windings often constitute a sizable non-revenue producing investment, it is a major purpose of this invention to devise a system in which such auxiliary windings can help furnish a portion of the secondary load.

Another object is to obtain a greater neutral stabilizing capacity from a given size of such auxiliary delta windings.

A further object is to effect a substantial reduction in the investment in such windings for a specified stabilizing duty.

A still further object of the invention is to make it permissible for the stabilizing windings to be designed for any convenient or economical voltage and still be able to help furnish a portion of the secondary load.

Figure 1:
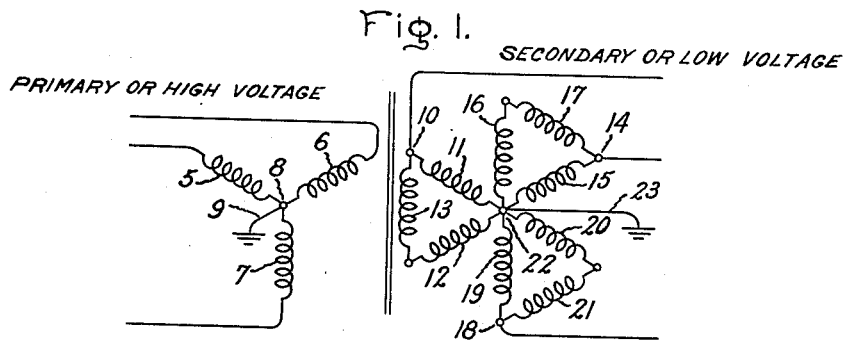
Figure 2:
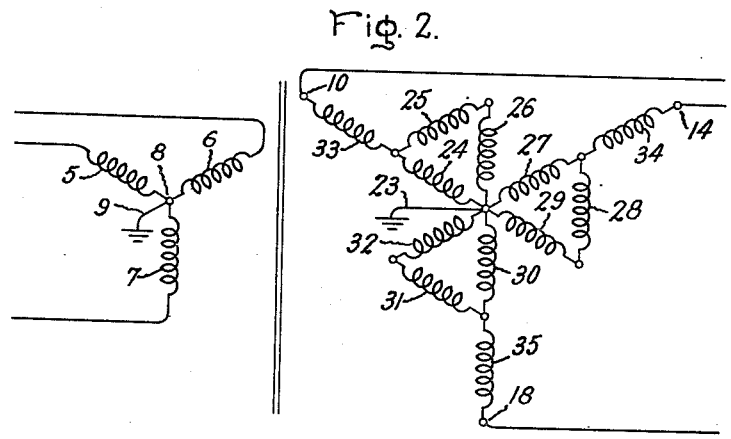
Figure 3:
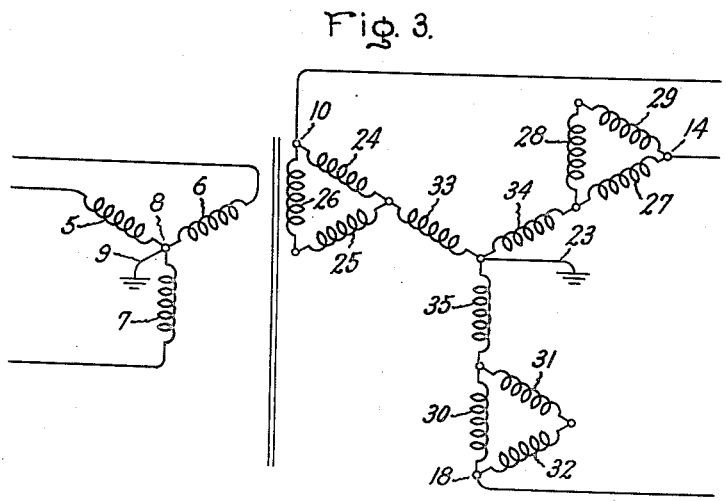

Other objects and advantages of the invention will be clear from the following description and the accompanying drawing in which Fig. 1 illustrates diagrammatically a preferred embodiment of the invention, and Figs. 2 and 3 are modifications illustrating a greater generality of the invention. Similar parts are similarly numbered in all figures.

Referring to Fig. 1, parts 5, 6, and 7 represent, in the conventional diagrammatic fashion, the high-voltage windings of a three-phase transformer bank in the well-known Y connection, with neutral point 8, and neutral lead 9 which is shown as grounded. Terminals 10, 14, and 18 are the low-voltage line terminals of the transformer, and it will be observed that they include an unusual arrangement of windings which could be described as three deltas connected to each other in a symmetrical Y fashion. Thus coils 11, 12, and 13 constituting one phase of this Y constitute also one delta; 15, 16, 17 another phase of the Y and another delta; and 19, 20, 21 the third phase of the Y and the third delta. And these three deltas are seen to be connected to each other at a common point 22 in a symmetrical fashion, with the neutral lead 23 shown grounded.

As conventional in transformer winding diagrams, the coils that are shown as parallel to each other are considered as belonging to the same phase and located on the same core in single-phase units and on the same core leg in polyphase units. Thus, coils 13, 16, and 19 will be understood as located on the same core leg with coil 7, these four coils being shown parallel to each other. Similar comments apply to the other sets of parallel coils, such as the set 5, 17, 11, 20; and the set 6, 12, 15, 21.

As will be obvious to those skilled in the art, since the three deltas are alike and may be considered in phase with each other, it is necessary that the corners of the three deltas chosen to constitute the neutral point 22, and the corner points chosen to constitute the line terminals 10, 14, and 18 be so chosen as to result in a symmetrical Y system with 120 degree phase difference between the phases (10—22) and (14—22), between (14—22) and (18—22), and between (18—22) and (10—22).

The current-carrying capacity of the various coils can be proportioned in various permissible ways. For instance, in one preferred scheme, they would be as follows: The capacity of coil 11 will be two-thirds of the rated current of the low voltage system entering (or leaving) the transformer at terminal 10, and the capacities of coils 12 and 13 individually will be one-half of that of coil 11, or one-third of the line current at 10. Similarly, the capacity of coil 15 will be two-thirds of the line current entering or leaving at 14; and the capacities of coils 16 and 17 individually will be equal to one-half of that of coil 15, or one-third of that of the line current at 14. Similarly, the capacity of coil 19 will be the same as that of coil 15, and the capacities of coils 20 and 21 individually the same as those of coils 16 and 17.

In this arrangement, there are obviously two sizes of secondary coils; 11, 15, and 19 are alike, and each one of these has two-thirds of the k. v. a. capacity of the corresponding high-voltage coil 5, 6, or 7; and the others are alike, each one with one-third of the k. v. a. capacity of coil 5, 6, or 7. As the maximum circulating-current capacity of each delta is 33 percent, and there are three deltas to stabilize the neutral, their combined neutral-stabilizing ability will be that of a single 100 percent delta winding.

The physical capacity of this low-voltage system of coils compared with the high-voltage system of coils will be $3(0.66+0.33+0.33)/3=1.33$. That is, with only 33 percent increase in the physical capacity of the low-voltage windings, the stabilizing ability of a 100 percent tertiary delta is obtained.

It will be seen in Fig. 1 that the line current entering the transformer at, say, terminal 10 divides between coils 11 and 13, and as the capacity of 11 is for two-thirds of the line current, and that of 13 one-third of the line current, it is necessary to adjust the reactances of the windings to be consistent with this desired division of current. As the current in coil 13 flows also in coil 12 in series relationship, the reactance drops of these two coils are also in series for this current; and as this combination is in parallel with the single coil 11, it follows that in a symmetrical arrangement of windings, such that coils 11, 12, and 13 have equal equivalent leakage impedances, the impedance relationship of the two parallel paths will be as one to two, and, therefore, the division of the line current between 11 and 13 will naturally be in the inverse ratio, that is, two to one.

As another scheme of proportioning the currents among the low-voltage coils, let it be assumed that all low-voltage coils are alike in current capacity. This then calls for adjustment of reactances for equal division of line current between parallel branches. The physical capacity of such a low-voltage winding, compared with the simple Y high-voltage winding, will be $3(.5+.5+.5)/3=1.50$. That is, the low-voltage k. v. a. capacity is increased 50 percent over that of the high voltage. The delta stabilizing capacity will be $3 \times 0.5=150$ percent.

If a stabilizing ability less than that of a 100 percent delta will do, the capacity of the windings can be reduced as follows:

Let it be required to provide the equivalent of a 33 percent tertiary delta winding. Then the current capacity of each one of the coils 12, 13, 16, 17, 20, and 21 need be only one-ninth of the line current, and that of 11, 15, and 19, eight-ninths each, with appropriate reactances in the windings consistent with this distribution of current. The relative physical capacity of the low-voltage coils will now be $3(8/9+1/9+1/9)/3=1.11$. That is, the physical capacity of the low-voltage winding will be only 11 percent larger than that of the high-voltage winding to constitute the equivalent of a 33 percent tertiary delta stabilizing winding.

Fig. 2 illustrates a modification of the low-voltage winding system in which the three deltas are wound for a fraction of the low-voltage terminal voltages appearing among 10, 14, and 18. Coils 24—33, 27—34, and 30—35 will be seen as in Y relationship to each other and to the line terminals 10, 14, and 18. Coils 33, 34, and 35 will be designed for a current rating equal to the rated line current. Let the coils 24, 27, and 30 be designed for one-half of the voltages of 33, 34, or 35 and for two-thirds of the line current; and the coils 25, 26, 28, 29, 31, and 32 for one-third of the line current, adjusting the reactances of these windings to be consistent with the division of the current flowing in 33 to divide between 24 and 25 with two-thirds in 24 and one-third in 25, the current flowing in 25 flowing also in 26. Similar ratios will be observed in the other phases of the system.

The physical size of this low-voltage winding system in terms of the high-voltage (or line) k. v. a. will be $3(0.66+0.33 \times 0.66+.33 \times .33 \times 2)/3=1.11$. That is, the physical capacity of this low-voltage winding system is 111 percent. Its neutral stabilizing capacity will be $3(0.33 \times 0.33)=0.33$, that is, it will be the equivalent of a 33 percent tertiary with only 11 percent increase in the physical size of the secondary. This is the same economy as the last case discussed above, but now the delta windings are wound for only a third of that voltage, reducing the cost of their insulation.

A reinspection of the figures will show that the novel winding system contemplated by the invention is a composite of Y and delta systems conductively associated with each other and include in each phase an element common to the Y and to the delta portions of the system. Thus, referring to Fig. 1, the coils 11, 15, and 19 will be seen to constitute a Y, and this Y includes the coil 11 which is also an element in common with the delta (11, 12, 13). Similarly, coil 15 will be seen as an element in common with the Y (11—15—19) and the delta (15—16—17), and coil 19 will be seen as an element in common with the same Y as before and the delta (19—20—21). In Fig. 2, coil 24 is the winding element common to the Y and to the delta (24—25—26), 27 common to the Y and to the delta (27—28—29), and 30 common to the Y and to the delta (30—31—32).

It will also be obvious that the economies secured by this invention accrue from the fact that there are no idle windings: The delta windings assist the Y windings in supplying the low-voltage terminal load.

The delta windings could equally well be associated with the high-voltage winding, but the insulation expense will be less if associated with the low-voltage winding.

The delta windings need not be located at the neutral end of the Y but could also be located at other points along the Y, even at the line terminals as illustrated in Fig. 3.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States is:

1. A symmetrical three-phase alternating-current transformer winding system having a neutral and three line terminals and at least three windings per phase, three of said windings from different phases being connected in Y phase relationship between said neutral and said three line terminals so that the voltages of said three windings are in phase respectively with the line terminal to neutral voltages of said system, the remaining windings being grouped in pairs and said pairs being connected respectively in closed delta relationship with said three windings which are connected in Y phase relationship between said neutral and said three line terminals, each of said delta connections of windings having a terminal which is isolated from said neutral and said line terminals.

2. The system of claim 1 including a set of Y-connected windings associated with said delta-connected windings in reversible primary-secondary relationship therewith.

3. The system of claim 1 including a set of windings in Y connection having a different one of said Y-connected windings in series respectively with one of a different set of said delta-connected windings in each phase of said system.

4. The system of claim 1 in which the sets of delta-connected windings adjoin each other at a point constituting a symmetrical neutral for the system of said delta-connected windings and a set of windings in Y-connection having a different one of said Y-connected windings in series respectively with one of a different set of said delta-connected windings in each phase of said system.

ARAM BOYAJIAN.

References Cited in the file of this patent

Die Wechselstromtechnik (E. Arnold) Zweiter Band; published by Springer, Berlin, 1910 (page 393 relied on).